United States Patent
Gueron et al.

(10) Patent No.: US 8,804,951 B2
(45) Date of Patent: *Aug. 12, 2014

(54) SPEEDING UP GALOIS COUNTER MODE (GCM) COMPUTATIONS

(75) Inventors: Shay Gueron, Haifa (IL); Michael E. Kounavis, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 13/196,718

(22) Filed: Aug. 2, 2011

(65) Prior Publication Data

US 2012/0106731 A1    May 3, 2012

Related U.S. Application Data

(63) Continuation of application No. 11/772,150, filed on Jun. 30, 2007, now Pat. No. 7,991,152, and a continuation-in-part of application No. 11/729,214, filed on Mar. 28, 2007, now abandoned.

(51) Int. Cl.
H04K 1/00    (2006.01)

(52) U.S. Cl.
USPC .............................................. 380/28; 380/29

(58) Field of Classification Search
USPC .................................... 380/28, 29, 44, 255
See application file for complete search history.

(56) References Cited

U.S. PATENT DOCUMENTS

| 5,999,959 A | 12/1999 | Weng et al. |
| 2003/0208518 A1 | 11/2003 | Gura et al. |
| 2004/0117623 A1 | 6/2004 | Kalogridis et al. |
| 2006/0282743 A1 | 12/2006 | Kounavis |
| 2007/0106896 A1 * | 5/2007 | Sandberg et al. ............. 713/170 |

OTHER PUBLICATIONS

Office Action received for Chinese Patent Application No. 200810214759.4, mailed on May 12, 2010, 1 page of English Translation and 2 pages of Chinese Office Action.
Notice of Grant received for Chinese Patent Application No. 2008102147594, mailed on Jul. 27, 2011, 2 pages of English Translation and 2 pages of Chinese Notice of Grant.
McGrew et al., "The Galois/Counter Mode of Operation (GCM)", Oct. 25, 2007, 43 pages.
Shen et al., "Unbalanced Exponent Modular Reduction over Binary Field and Its Implementation", XP007905412, Proceedings of the First International Conference on Innovative Computing, Information and Control, Aug. 30, 2006, 4 pages.
Phatak et al., "Fast modular reduction for large wordlengths via One Linear and One Cyclic Convolution", Proceedings of the 17th IEEE Symposium on Computer Arithmetic, Jun. 27-29, 2005, 8 pages.

(Continued)

*Primary Examiner* — Farid Homayounmehr
*Assistant Examiner* — Suman Debnath
(74) *Attorney, Agent, or Firm* — Caven & Aghevli LLC

(57) ABSTRACT

Methods and apparatus to speed up Galois Counter Mode (GCM) computations are described. In one embodiment, a carry-less multiplication instruction may be used to perform operations corresponding to verification of an encrypted message in accordance with GCM. Other embodiments are also described.

20 Claims, 5 Drawing Sheets

(56) References Cited

OTHER PUBLICATIONS

Jachimiec et al., "Acceleration of Finite Field Arithmetic Algorithms in Embedded Processing Platforms Utilizing Instruction Set Extensions", Department of Electrical and Computer Engineering, IEEE EIT 2007 Proceedings, May 1, 2007, pp. 135-139.

Fiskiran et al., "Evaluating Instruction Set Extensions for Fast Arithmetic on Binary Finite Fields", Sep. 27, 2004, 12 pages.

Gladman, Brian, "AES and Combined Encryption/Authentication Modes", Released on Jun. 19, 2006, 2 pages.

Office Action received for European Patent Application No. 08251201.3, mailed on Aug. 21, 2008, 9 pages of Office Action including 3 pages of European Search Report.

Office Action Received for Chinese Patent Application No. 200810214759, mailed on Sep. 4, 2009, 6 pages of Office Action and 6 pages of English Translation.

Office Action Received for European Patent Application No. 08251201.3, mailed on Feb. 13, 2009, 1 page.

\* cited by examiner

SPEEDING UP GALOIS COUNTER MODE (GCM) COMPUTATIONS

RELATED APPLICATIONS

This application is a continuation of U.S. patent application Ser. No. 11/772,150, entitled "SPEEDING UP GALOIS COUNTER MODE (GCM) COMPUTATIONS", filed Jun. 30, 2007, issued on Aug. 2, 2011, as U.S. Pat. No. 7,991,152, which claims priority from and is a continuation-in-part of U.S. patent application Ser. No. 11/729,214, filed Mar. 28, 2007, now abandoned entitled "SPEEDING UP THE COMPUTATION OF MESSAGE AUTHENTICATION CODES FOR NETWORK COMMUNICATIONS." which are hereby incorporated herein by reference for all purposes.

BACKGROUND

The present disclosure generally relates to the field of computing. More particularly, an embodiment of the invention generally relates to techniques for speeding up Galois Counter Mode (GCM) computations.

In cryptography, a block cipher may be a symmetric key cipher which operates on fixed-length groups of bits referred to as "blocks." For example, during encryption, a block cipher may take a 128-bit block of plaintext as input and output a corresponding 128-bit block of ciphertext in accordance with a secret key. For decryption, the 128-bit block of ciphertext and the secret key may be used to determine the original 128-bit block of plaintext.

GCM is a mode of operation for symmetric key cryptographic block ciphers. Generally, GCM is defined for block ciphers with a block size of 128 bits. GCM may involve two operations. First, the output of a block cipher may be multiplied by a hash key in a finite field. Second, the multiplication result may be reduced in size.

One current software-based GCM technique may utilize table lookups. However, building and storing of the tables may be time-consuming and resource intensive. For example, the tables may not readily fit into a level 1 (L1) cache of a processor and may require access to memory off chip, which in turn introduces latency. Other approaches may utilize a hardware-based technique, for example, found in cryptographic processors, which perform the reduction using a tree of exclusive OR (XOR) gates specific to the polynomial of the finite field. This approach is field specific and cost-prohibitive for some implementations.

Accordingly, current techniques for performing computations associated with GCM may be time-consuming and/or cost-prohibitive.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
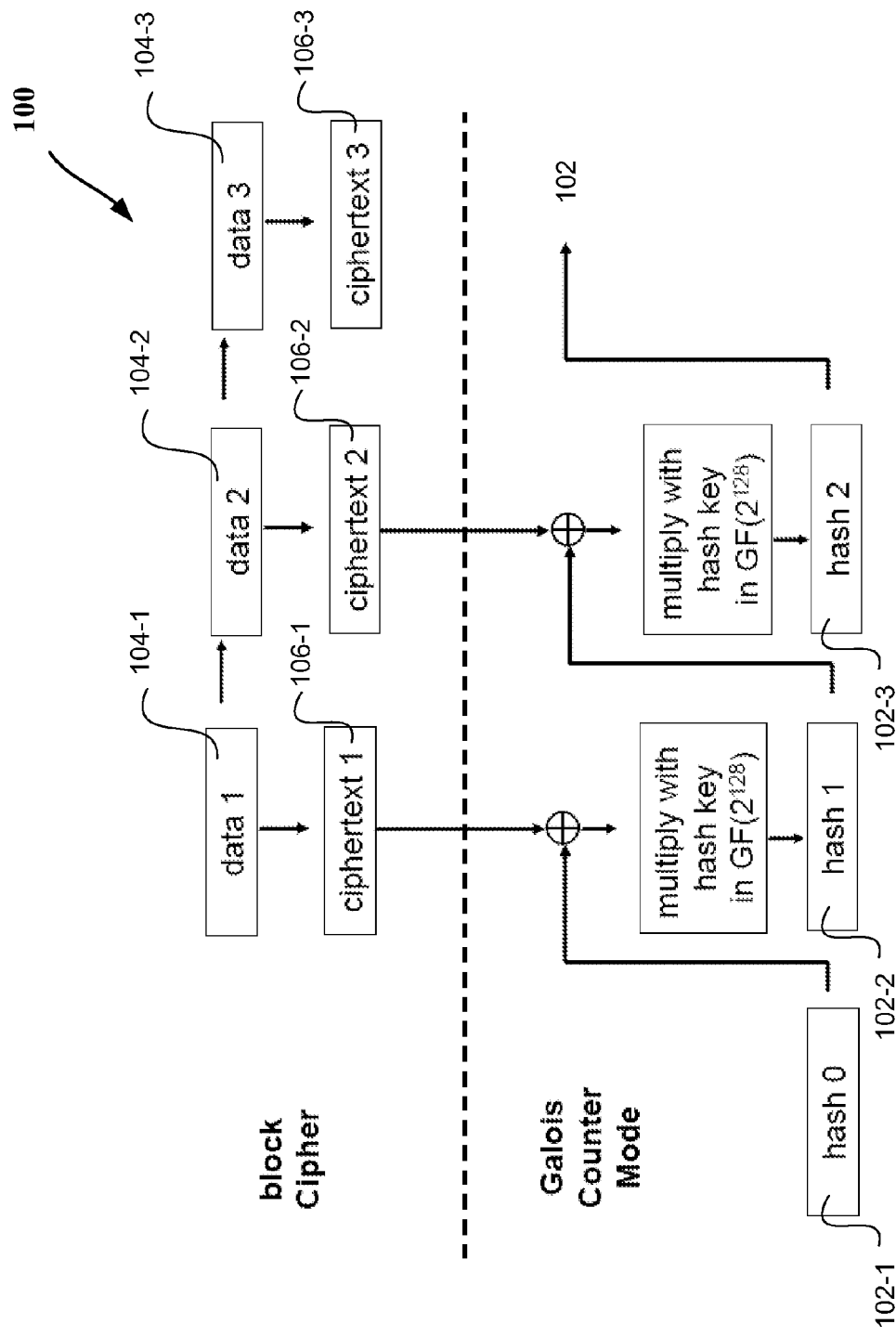
FIG. 1 illustrates an embodiment of a Galois Counter Mode (GCM), which may be utilized in accordance with some embodiments.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software (including for example micro-code that controls the operations of a processor), or some combination thereof. Also, the use of "instruction" or "micro-operation" (which may also be referred to as "uop") herein may be interchangeable.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Some of the embodiments discussed herein may speed up Galois Counter Mode (GCM) computations for block ciphers. For example, a single general-purpose processor core (e.g., based on Core Microarchitecture of Intel® Corporation) may potentially support 10 Gbps networking. In one embodiment, carry-less multiplications operations may be combined with fast reduction to speed up GCM computations. In an embodiment, an instruction (e.g., "GFMUL" in accordance with at least one instruction set architecture) may cause computation of a carry-less multiplication of two 64-bit inputs. In an embodiment, a processor executing the instruction (such as the processor of FIGS. 4-5) may include one or more of: a memory (e.g., a level 1, last level cache, etc.) to store the instruction, a fetch unit to fetch the instruction from the memory, a decode unit to optionally decode the fetched instruction, a schedule unit to schedule the instruction (or corresponding uops) for execution, and one or more execution units to execute the instructions (or corresponding uops).

Moreover, GCM is a recently recommended mode of operation for block ciphers, used for confidentiality and authentication. In particular, the Advanced Encryption Standard (AES) Galois Counter Mode (AES-GCM) has become an increasingly prominent mode used for packet processing in fast networking. GCM is typically implemented by taking a 128 bit output of a block cipher and multiplying it in Galois Field (GF) of $2^{128}$ by a hash key, which is constant during the session. Multiplication in GF ($2^{128}$) consists of two phases: (i) carry-less multiplication of the two 128-bit operands, to generate a 256-bit result; and (ii) reduction modulo the irreducible polynomial $g(x)=x^{128}+x^7+x^2+x+1$. The polynomial "g" is called a "pentanomial" because it may be represented as a 128-bit string with only 5 bits equal 1. In one embodiment, a carry-less multiplication may use the GFMUL instruction discussed herein as a building block to obtain the carry-less multiplication of two 128-bit inputs for GCM. Furthermore, an embodiment reduces the 256-bit result modulo the pentanomial g of the finite field, e.g., to improve the overall performance.

In particular, FIG. 1 illustrates an embodiment of a Galois Counter Mode (GCM) 100, which may be utilized in accordance with some embodiments. As shown, the mode may produce a message digest 102, called "Galois Hash", from the encrypted data generated by a block cipher, e.g., data 104-1 through 104-3 may be encrypted based on a key to generate ciphertext 106-1 through 106-3, respectively. This Galois Hash is used for high performance message authentication. In each operation of the mode, the previous value of the Galois Hash is XOR-ed with the current ciphertext block (e.g., 106-1 is XOR-ed with 102-1, 106-2 is XOR-ed with 102-2, etc.). The result is then multiplied in GF $(2^{128})$ with a hash key value, where the GF $(2^{128})$ finite field is defined by the irreducible polynomial g=g(x)=$x^{128}+x^7+x^2+x+1$. Consequently, the multiplication in GF $(2^{128})$ involves carry-less multiplication of the two 128-bit operands, to generate a 256 bit result and reduction modulo the irreducible polynomial g, mentioned earlier.

Carry-Less Multiplication

Carry-less multiplication, also known as Galois Field Multiplication is the operation of multiplying two numbers without generating or propagating carries. In the standard integer multiplication, the first operand is shifted as many times as the positions of bits equal to "1" in the second operand. The product of the two operands is derived by adding the shifted versions of the first operand with each other. In the carry-less multiplication the same procedure is followed except that additions do not generate or propagate carry. In this way, bit additions are equivalent to the XOR logical operation.

Carry-less multiplication is formally defined as follows: let the two operands be A, B, of size n bits each. Let the number A be the following array of bits:

$$A = [a_{n-1} a_{n-2} \ldots a_0] \quad (1)$$

Let also the number B be:

$$B = [b_{n-1} b_{n-2} \ldots b_0] \quad (2)$$

Let the carry-less multiplication result be the following bit array:

$$C = [c_{2n-1} c_{2n-2} \ldots c_0] \quad (3)$$

The bits of the output C are defined as the following logic functions of the bits of the inputs A and B:

$$c_0 = a_0 b_0 \quad (4)$$
$$c_1 = a_0 b_1 \oplus a_1 b_0$$
$$\ldots$$
$$c_{n-1} = a_0 b_{n-1} \oplus a_1 b_{n-2} \oplus \ldots \oplus a_{n-1} b_0$$
and:

$$c_n = a_1 b_{n-1} \oplus a_2 b_{n-2} \oplus \ldots \oplus a_{n-1} b_1 \quad (5)$$
$$\ldots$$
$$c_{2n-2} = a_{n-1} b_{n-1}$$
$$c_{2n-1} = 0.$$

Equations (4) and (5) may be written in compact form as:

$$c_i = \bigoplus_{j=0}^{i} a_j b_{i-j} \quad (6)$$

for $0 \le i \le n-1$, and:

$$c_i = \bigoplus_{j=i-n+1}^{n-1} a_j b_{i-j} \quad (7)$$

for $n-1 \le i \le 2n-1$.

From the hardware implementation point of view, one may see that each of the logic functions of equations (6) and (7) may be implemented using XOR trees. The deepest XOR tree is the one implementing the function $c_{n-1}$ which takes n inputs. For example, a 64-bit instruction for Galois Field multiplication (e.g., "GFMUL") requires 1+2+ . . . +62+63+62+ . . . +1=3969 XOR gates. Furthermore, the total number of AND gates required for GFMUL is 1+2+ . . . +64+63+ . . . +1=4096. Hence, the total number of logical gates, required for implementing GFMUL is 8065. As can readily be seen, this number of gates dedicated to GCM computations may be cost-prohibitive in some implementations. In the following we denote carry-less multiplication (GFMUL) by the symbol '*'.

GCM In Software

Some current implementations of the GCM mode may use a table lookup algorithm that consists of two phases. First, during a preprocessing phase 16 different tables may be created. Each table has 256 entries and each entry is 128 bit long. Each entry j of table $T_i$ stores the value (j*hash key*$2^8_i$ with the) mod g. Second, run time phase in which the algorithm takes the next ciphertext block and XOR-s it with the current value of the Galois Hash. The result is multiplied with the Hash Key in GF $(2^{128})$ as follows: the value of the result is segmented into 16 slices, where each slice is 8 bit long. Subsequently, 16 table lookups are performed using the slices, for indexing the tables. The results from the table lookups are XOR-ed with each other. This algorithm performs operations on a per-byte basis: for each 128 bit block 16 table lookups and 16 128-bit XOR operations take place.

As can be seen, this algorithm may not be very efficient in software due to the cost of table lookups. The total size of the tables required for this algorithm is 16·256·16 bytes=64K bytes. Since processors typically may have 32K bytes in their L1 cache, these tables do not fit in this cache, and have to be accessed from the second level (L2) cache or other less accessible memory, which introduces latency. For example, accessing the L2 cache implies a significant performance penalty, even if memory accesses may be pipelined. For example, with caches associated with access time of 10-20 clock cycles (hereafter referred to as "clocks"), the measured cost of GCM might be 20 cycles/byte.

Figure 2:
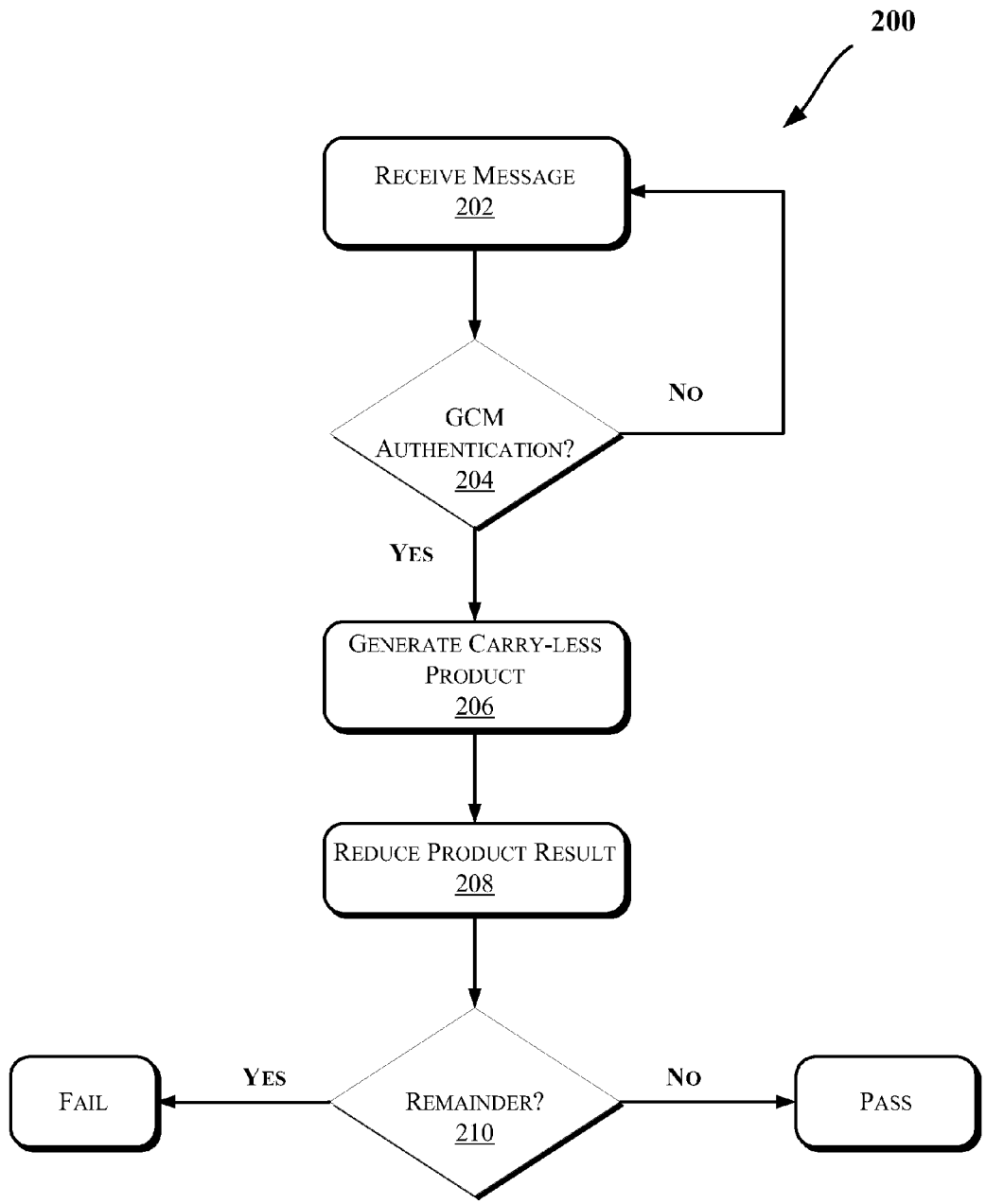
FIGS. 2 and 3 illustrate flow diagrams of methods, according to some embodiments of the invention.

FIG. 2 illustrates a block diagram of a method 200 to perform operations associated with GCM, in accordance with an embodiment of the invention. In one embodiment, various components discussed herein, e.g., with reference to FIGS. 1 and 3-4 may be utilized to perform one or more of the operations discussed with reference to FIG. 2. For example, the method 200 may be used to perform GCM on data communicated over the network 403 of FIGS. 4-5.

Referring to FIGS. 1-5, at an operation 202, a message may be received (e.g., in the form of a data packet communicated over a computer network such as network 403). At an operation 204, it may be determined whether the received message is to be authenticated in accordance with GCM (e.g., ciphertext(s) 106-1, 106-2, etc. are to be authenticated). In an embodiment, a portion of a data packet (corresponding to an encrypted message) communicated over the network 403 (such as the packet header) may be decoded at operation 204 to determine whether the message is to be authenticated in accordance with GCM.

At an operation 206, a carry-less product may be generated. In an embodiment, a 128-bit by 128-bit carry-less multiplication may be performed to generate the product at operation 206, e.g., by utilizing a 64-bit instruction (e.g., GFMUL instruction discussed herein) as follows.

Carry-Less Product using 64-Bit GFMUL Instruction

The input operands may be denoted by $[A_1:A_0]$ and $[B_1:B_0]$, where $A_1$, $A_0$, $B_1$, and $B_0$ are 64 bits long each.

Obtaining a 128-bit by 128-bit Carry-less Product: First, the following operands may be multiplied: $A_1$ with $B_1$, $A_0$ with $B_0$, and $A_0 \oplus A_1$ with $B0 \oplus B1$. Let the results of the above three multiplications be: $[C_1:C_0]$, $[D_1:D_0]$ and $[E_1:E_0]$, respectively. During a second operation, construct the 256-bit output of the multiplication $[A_1:A_0]*[B_1:B_0]$ as follows:

$$[A_1:A_0]*[B_1:B_0]=[C_1:C_0 \oplus C_1 \oplus D_1 \oplus E_1:D_1 \oplus C_0 \oplus D_0 \oplus E_0:D_0] \quad (8)$$

Performance: the speed of this phase may be estimated in the case where the throughput of the GFMUL instruction is 2 clocks and its latency for the first multiplication in a sequence is 4 clocks. These may be considered as worst case latency numbers based on real-world current hardware implementations. It is easy to follow this analysis with different parameters.

Consider the following operations in a typical Intel® IA processor with the EM64T 64-bit register set. First the values $A_1$ and $B_1$ are moved into the register RAX and some other register from the general purpose set. The value $A_1$ is XOR-ed with $A_0$ and the value $B_1$ with $B_0$. All these operations may be completed in 1 clock. Then, the GFMUL instruction multiplies $A_1$ with $B_1$ carry-less. This is done in 4 clocks. Next, the results from this multiplication are moved to the registers holding the final product. After this operation, the values $A_0$, $B_0$ are moved to RAX and another general purpose register in order to be multiplied with each other. These operations may be done in 2 clocks. Subsequently the product $A_0*B_0$ is computed in 2 clocks and the result is XOR-ed with the registers holding the final product. Next, the values $A_0 \oplus A_1$ and $B_0 \oplus B_1$ are moved into RAX plus some other register. These operations may be done in 2 clocks. Finally, the GFMUL instruction multiplies $A_0 \oplus A_1$ with $B_0 \oplus B_1$ (2 clocks) and the result is XOR-ed with the register pair holding the final value (1 clock). The estimated total latency of this phase is 14 clocks in this example.

Referring to FIG. 2, at an operation 208, the carry-less product generated at operation 206 may be reduced. Further details of reduction performed in accordance with an embodiment will be discussed herein with reference to FIG. 3 below.

At an operation 210, it may be determined whether a remainder exists (e.g., as determined based on the reduction performed at operation 208). If a remainder exists, then the authentication in accordance with GCM fails (which may be signaled by generation of an error signal in an embodiment). Otherwise, the authentication will be successful.

Reducing the 256-Bit Product

Figure 3:
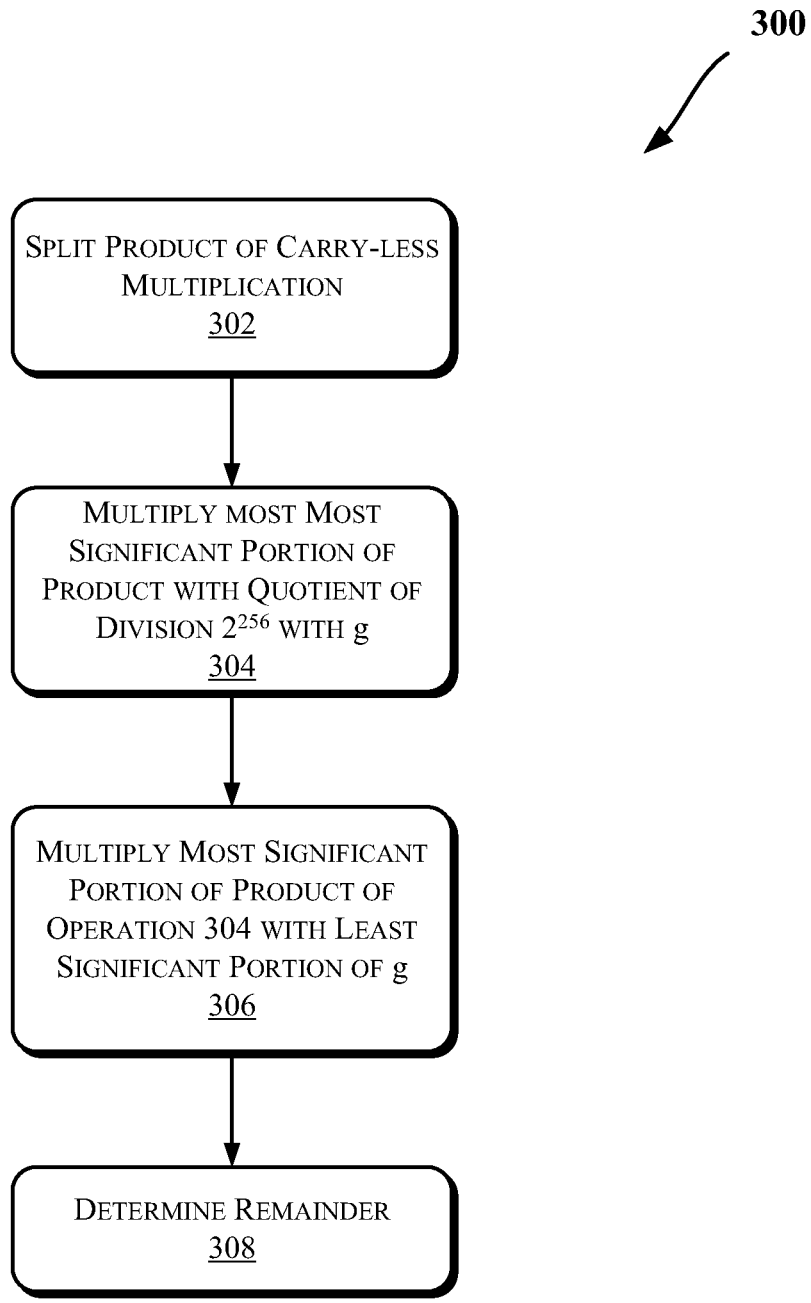

FIG. 3 illustrates a method 300 to perform a reduction in accordance with an embodiment. The method 300 illustrates further details of the operations 208 and/or 210 of FIG. 2 in accordance with one embodiment. As illustrated in FIG. 3, to reduce the (256-bit) product, the product may be split it into two (128-bit) parts at an operation 302. The least significant half may be XOR-ed with the final remainder since the degree of g is 128 as will be further discussed below. For the most significant part, division may be realized via two multiplications. Since the least significant half of the input does not need to be taken into account, an efficient generation of a remainder $p(x)$ may be considered, defined as follows:

$$p(x)=c(x) \cdot x^t \bmod g(x) \quad (9)$$

Here, $c(x)$ is a polynomial of degree s−1 with coefficients in GF(2), representing the most significant bits of the carry-less product. In the current case of AES-GCM, s=128.

t is the degree of the polynomial g. In the current case t=128. $g(x)$ is the irreducible polynomial of the final field used in AES-GCM.

For the polynomials $p(x)$, $c(x)$, and $g(x)$:

$$c(x)=c_{s-1}x^{s-1}+c_{s-2}x^{s-2}+\ldots+c_1x+c_0,$$

$$p(x)=p_{t-1}x^{t-1}+p_{t-2}x^{t-2}+\ldots+p_1x+p_0, \text{ and}$$

$$g(x)=g_tx^t+g_{t-1}x^{t-1}+\ldots+g_1x+g_0 \quad (10)$$

Hereafter, the notation $L^u(v)$ may be used to denote the coefficients of u least significant terms of the polynomial v and $M^u(v)$ to denote the coefficients of its u most significant terms. The polynomial $p(x)$ maybe express as:

$$p(x)=c(x) \cdot x^t \bmod g(x)=g(x) \cdot q(x) \bmod x^t \quad (11)_a$$

where $q(x)$ is a polynomial of degree s−1 equal to the quotient from the division of $c(x) \cdot x^t$ with g. In equation (11), the t least significant terms of the dividend $c(x) \cdot x^t$ equal zero. Further, the dividend $c(x) \cdot x^t$ may be expressed as the sum of the polynomials g·q and p:

$$c(x) \cdot x^t=g(x) \cdot q(x)+p(x) \quad (12)$$

where operator '+' means XOR ('⊕'). From equation (12) one may expect that the t least significant terms of the polynomial g·q are equal to the terms of the polynomial p. Only if these terms are equal to each other, the result of the XOR operation g·q⊕p is zero for its t least significant terms. Hence:

$$p(x)=g(x) \cdot q(x) \bmod x^t = L^t(g(x) \cdot q(x)) \quad (13)$$

Now $g(x)$ may be defined as:

$$g(x)=g_tx^t \oplus g^*(x) \quad (14)$$

The polynomial g* represents the t least significant terms of the polynomial g and:

$$p(x)=L^t(g(x) \cdot q(x))=L^t(q(x) \cdot g^*(x)+q(x) \cdot g_tx^t) \quad (15)$$

However, the t least significant terms of the polynomial $q \cdot g_t \cdot x^t$ are zero. Therefore:

$$p(x)=L^t(q(x) \cdot g^*(x)) \quad (16)$$

From equation (16) it follows that in order to compute the remainder p we need to know the value of the quotient q. The quotient may be calculated in a similar manner:

$$(11) \Leftrightarrow c(x) \cdot x^{t+s}=g(x) \cdot q(x) \cdot x^s+p(x) \cdot s^s \quad (17)$$

Let:

$$x^{t+s}=g(x) \cdot q^+(x)+p^+(x) \quad (18)$$

where $q^+$ is an s-degree polynomial equal to the quotient from the division of $x^{t+s}$ with g and $p^+$ is the remainder from this division. The degree of the polynomial $p^+$ is t−1. From equations (17) and (18) we get:

$$\left.\begin{array}{l}(17) \\ (18)\end{array}\right\} \Leftrightarrow c(x) \cdot g(x) \cdot q^+(x) + c(x) \cdot p^+(x) = g(x) \cdot q(x) \cdot x^s + p(x) \cdot x^s \quad (19)$$

and $$(19) \Rightarrow M^s(c(x) \cdot g(x) \cdot q^+(x) + c(x) \cdot p^+(x)) = M^s(g(x) \cdot q(x) \cdot x^s + p(x) \cdot x^s) \quad (20)$$

One may see that the polynomials $c \cdot g \cdot q^+$ and $g \cdot q \cdot x^s$ are of degree t+2·s−1 the polynomial $c \cdot p^+$ is of degree t+s−2, and the polynomial $p \cdot x^s$ is of degree t+s−1. As a result, the s most significant terms of the polynomials in the left and right hand side of equation (25) are not affected by the polynomials $c \cdot p^+$ and $p \cdot x^s$. Hence:

$$(20) \Leftrightarrow M^s(c(x) \cdot g(x) \cdot q^+(x)) = M^s(g(x) \cdot q(x) \cdot x^s) \quad (21)$$

Next, we observe that the s most significant terms of the polynomial $c \cdot g \cdot q^+$ equal to the s most significant terms of the polynomial $g \cdot M^s(c \cdot q^+) \cdot x^s$. The polynomial $M^s(c \cdot q^+) \cdot x^s$ results from $c \cdot q^+$ by replacing the s least significant terms of this polynomial with zeros. Moreover, the s most significant terms of the polynomial $c \cdot g \cdot q^s$ may be calculated by adding the s most significant terms of the polynomial $c \cdot q^+$ with each other in as many offset positions as defined by the terms of the polynomial g. Thus, the s most significant terms of $c \cdot g \cdot q^+$ do not depend on the s least significant terms of $c \cdot q^+$, and consequently, $$(21) \Leftrightarrow M^s(g(x) \cdot M^s(c(x) \cdot q^-(x)) \cdot x^s) = M^s(g(x) \cdot q(x) \cdot x^s) \quad (22)$$

Equation (22) is satisfied for q given by:

$$q = M^s(c(x) \cdot q^+(x)) \quad (23)$$

Since there is a unique quotient q satisfying equation (12) one may show that there is a unique quotient q satisfying equation (22). As a result this quotient q must be equal to $M^s(c(x) \cdot q^+(x))$. It follows that the polynomial p is found by:

$$p(x) = L^t(g^*(x) \cdot M^s(c(x) \cdot q^+(x))) \quad (24)$$

Accordingly, equation (24) indicates the operations for computing the polynomial p.

Preprocessing: For the given irreducible polynomial g the polynomials g* and q+ are computed first. The polynomial g* is of degree t−1 consisting of the t least significant terms of g, whereas the polynomial q+ is of degree s and is equal to the quotient of the division of $x^{t+s}$ with the polynomial g.

Calculation of the remainder polynomial:

Operation 1: The input c is multiplied with q+ (e.g., the 128 most significant bits of the product are multiplied with the quotient from the division $2^{256}$ with g at operation 304). The result is a polynomial of degree 2s−1.

Operation 2: The s most significant terms of the polynomial resulting from operation 1 are multiplied with g* (e.g., the 128 most significant bits of the result of operation 304 are multiplied with g* at operation 306). The result is a polynomial of degree t+s−2.

Operation 3: The algorithm returns the t least significant terms of the polynomial resulting from operation 2 (e.g., by XOR-ing the least significant portion of the result of operation 304 with the 128 least significant bits of the input at an operation 308). This is the remainder.

One may see that this algorithm involves 2 128-bit carry-less multiplications and 1 128-bit XOR operation. For the carry-less multiplication, one may use the carry-less technique described above for the first phase. The cost of this algorithm is at least 2·14=28 clocks in an embodiment.

Another embodiment may be applied if the special form of g (pentanomial) is taken into consideration. In one embodiment, this approach may be more efficient in some implementations. In particular, the quotient from the division of $x^{256}$ with g is g itself (e.g., as applied in operation 304). The polynomial $g=g(x)=x^{128}+x^7+x^2+x+1$ is essentially the bit sequence [1:<120 zeros>:10000111]. Accordingly, in an embodiment, at operations 304-306, the bit sequence may be multiplied carry-lessly with a 128 bit value and the 128 most significant bits may be obtained by: (i) Shifting the 64 most significant bits of the input by 63, 62 and 57 bit positions to the right; and (ii) XOR-ing these shifted copies with the 64 least significant bits of the input. This may be done in 4 clocks in some implementations. Next, this 128 bit result may be carry-less multiplied with g, and the 128 least significant bits may be kept. In an embodiment, this may be done by: (i) shifting the 128-bit input by 1, 2 and 7 positions to the left; and (ii) XOR-ing the results. The latter operations may be performed in 8 clocks in some implementations. Therefore, this efficient embodiment of the reduction may take 12 clocks (compared with 28 in the case discussed previously). Altogether, the total number of clocks for GCM may be 12+14=26 clocks for a 128 bits block (e.g., equal to 16 bytes) which translates to about 1.5 cycles/byte. Compared with the standard algorithm the proposed embodiments may achieve a significant speed up.

In accordance with some embodiments, a similar method for performing the first phase of some implementations discussed herein may be achieved with a 32-bit GFMUL instruction. Also, in addition to enabling high performance (e.g., 10 Gbps) secure networking, some embodiments may be applied to other network security applications such as virtual private networks (VPNs), network edge devices, etc. Furthermore, the currently used hash family Secure Hash Algorithm (SHA) may scale badly because its state increases with digest length. Techniques discussed herein may provide an alternative to SHA with AES-based authenticity schemes implemented in accordance with some embodiments discussed herein. Other implementations may utilized some of the embodiments discussed here for elliptic curve cryptography over binary fields (e.g., in accordance with FIPS 186-2, "Digital Signature Standard", Federal Information Processing Standard Publication FIPS 186-2, Jan. 27, 2000, available at: http://csrc.nist.gov/publications/fips), with fast bit reflection such as cyclical redundancy code (CRC) algorithms with general polynomials, etc.

Figure 4:
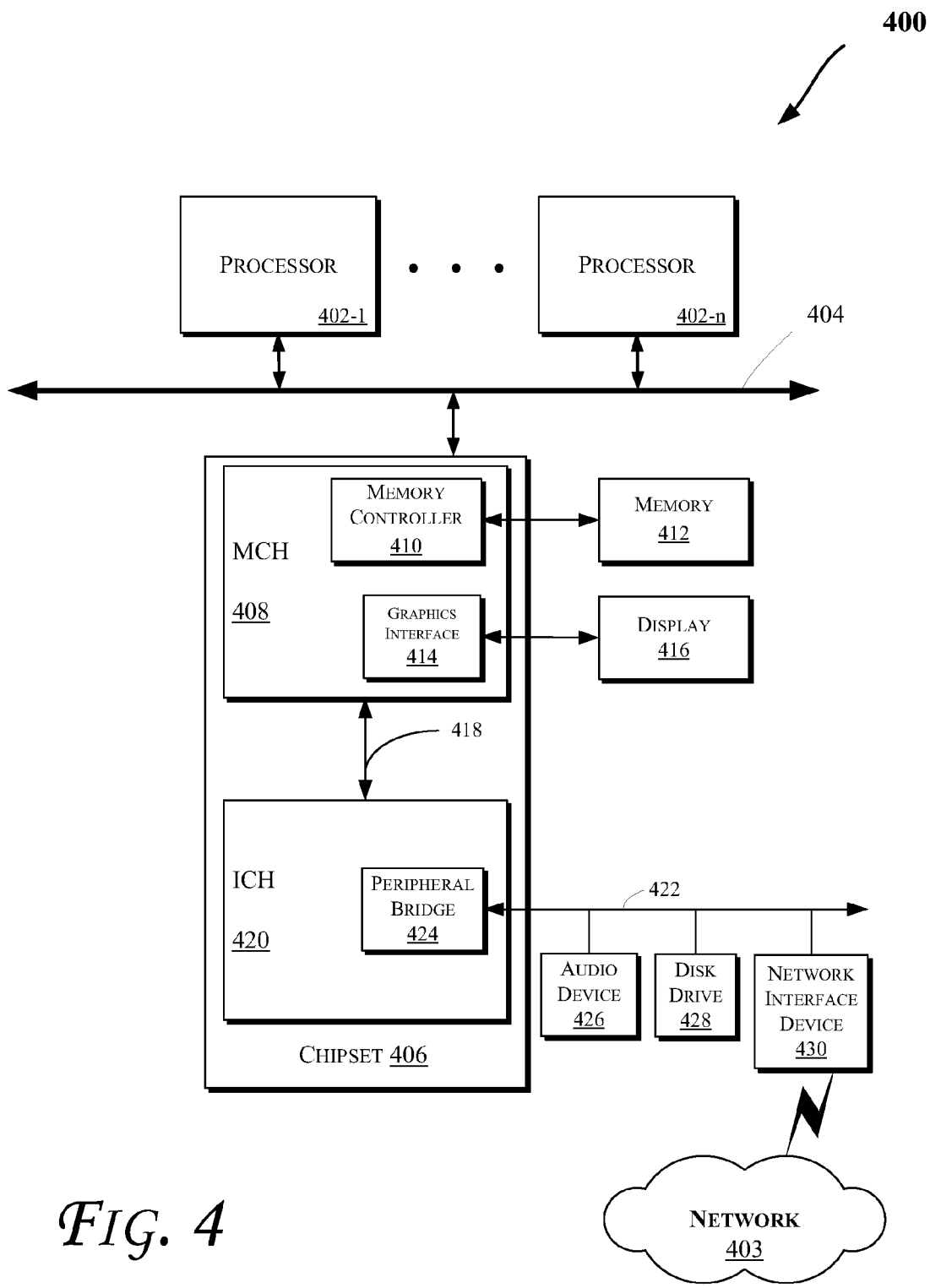
FIGS. 4 and 5 illustrate block diagrams of embodiments of computing systems, which may be utilized to implement some embodiments discussed herein.

FIG. 4 illustrates a block diagram of an embodiment of a computing system 400. In various embodiments, one or more of the components of the system 400 may be provided in various electronic devices capable of performing one or more of the operations discussed herein with reference to some embodiments of the invention. For example, one or more of the components of the system 400 may be used to perform the operations discussed with reference to FIGS. 1-3, e.g., by processing ciphertext(s) data 106-1, 106-2, etc. in accordance with the operations discussed herein. Also, various storage devices discussed herein (e.g., with reference to FIGS. 4 and/or 5) may be used to store data, operation results, etc. In one embodiment, data received over the network 403 (e.g., via network interface devices 430 and/or 530) may be stored in caches (e.g., L1 caches in an embodiment) present in processors 402 and/or 502. These processors may then apply the operations discussed herein in accordance with GCM (such as one or more of the operations of FIGS. 1-3) to authenticate messages.

Moreover, the computing system 400 may include one or more central processing unit(s) (CPUs) 402 or processors that communicate via an interconnection network (or bus) 404: The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. Moreover, the operations discussed with reference to FIGS. 1-2 may be performed by one or more components of the system 400.

A chipset 406 may also communicate with the interconnection network 404. The chipset 406 may include a memory control hub (MCH) 408. The MCH 408 may include a memory controller 410 that communicates with a memory 412. The memory 412 may store data, including sequences of instructions that are executed by the CPU 402, or any other device included in the computing system 400. In one embodiment of the invention, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The MCH 408 may also include a graphics interface 414 that communicates with a display 416. In one embodiment of the invention, the graphics interface 414 may communicate with the display 416 via an accelerated graphics port (AGP). In an embodiment of the invention, the display 416 may be a flat panel display that communicates with the graphics interface 414 through, for example, a signal converter that translates a digital representation of an image stored in a storage device such as video memory or system memory into display signals that are interpreted and displayed by the display 416. The display signals produced by the interface 414 may pass through various control devices before being interpreted by and subsequently displayed on the display 416.

A hub interface 418 may allow the MCH 408 and an input/output control hub (ICH) 420 to communicate. The ICH 420 may provide an interface to I/O devices that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430, which may be in communication with the computer network 403. In an embodiment, the device 430 may be a NIC capable of wireless communication. Other devices may communicate via the bus 422. Also, various components (such as the network interface device 430) may communicate with the MCH 408 in some embodiments of the invention. In addition, the processor 402 and the MCH 408 may be combined to form a single chip. Furthermore, the graphics interface 414 may be included within the MCH 408 in other embodiments of the invention.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 400 may be arranged in a point-to-point (PtP) configuration such as discussed with reference to FIG. 5. For example, processors, memory, and/or input/output devices may be interconnected by a number of point-to-point interfaces.

Figure 5:
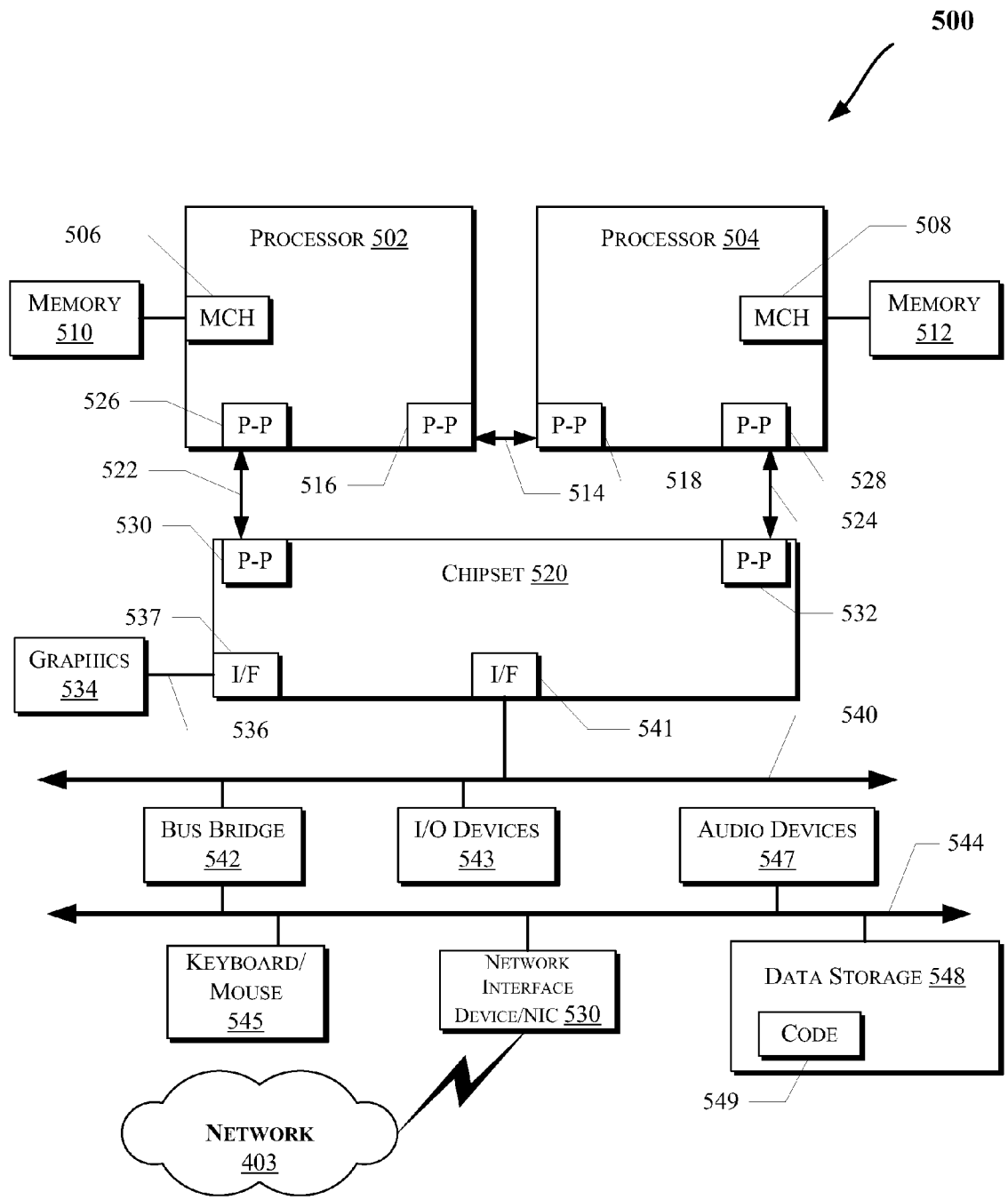

More specifically, FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to couple with memories 510 and 512. The memories 510 and/or 512 may store various data such as those discussed with reference to the memory 412 of FIG. 4.

The processors 502 and 504 may be any suitable processor such as those discussed with reference to the processors 402 of FIG. 4. The processors 502 and 504 may exchange data via a point-to-point (PtP) interface 514 using PtP interface circuits 516 and 518, respectively. The processors 502 and 504 may each exchange data with a chipset 520 via individual PtP interfaces 522 and 524 using point to point interface circuits 526, 528, 530, and 532. The chipset 520 may also exchange data with a high-performance graphics circuit 534 via a high-performance graphics interface 536, using a PtP interface circuit 537.

At least one embodiment of the invention may be provided by utilizing the processors 502 and 504. For example, the processors 502 and/or 504 may perform one or more of the operations of FIGS. 1-3. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5.

The chipset 520 may be coupled to a bus 540 using a PtP interface circuit 541. The bus 540 may have one or more devices coupled to it, such as a bus bridge 542 and I/O devices 543. Via a bus 544, the bus bridge 543 may be coupled to other devices such as a keyboard/mouse 545, the network interface device 530 discussed with reference to FIG. 5 (such as modems, network interface cards (NICs), or the like that may be coupled to the computer network 403), audio I/O device, and/or a data storage device 548. The data storage device 548 may store code 549 that may be executed by the processors 502 and/or 504.

Moreover, while a GFMUL instruction is not currently part of the instruction set of many processor architectures, it has been demonstrated that with the GFMUL instruction, combined with the operations discussed herein, a general purpose processor (e.g., based on Core Microarchitecture of Intel® Corporation) may potentially support 10 Gbps networking. Also, AES-GCM may be computationally intensive with the current instruction set of processors (e.g., even with no AES acceleration included), e.g., being associated with a latency of 45 cycles/byte in some implementations. If only AES is accelerated in hardware, the AES-GCM cost may be reduced to 20 cycles/byte, which still may not support high bandwidth networking. On the other hand, with a GFMUL instruction using the speed up techniques discussed herein, and accelerated AES in hardware, a single processor core may perform AES-GCM (i.e., bulk encryption and authentication in high speed packet processing) in a range of 10 Gbps. For example, consider a 4 GHz clock rate for a hypothetical processor core, and a (worst case) 3 clock AES round implementation. Here; using the proposed techniques, the GCM may be performed in 3.3 clocks/byte, translating to 10 Gbps.

Additionally, the difference between the embodiments discussed herein and other hardware realizations may be that the GFMUL instruction is not field specific and thus may be used in a variety of other applications (e.g., Elliptic Curve Cryptography). To avoid using a field-specific tree of XOR gates for reduction, at least some of the reduction approaches discussed herein may requires a relatively small number of shift and XOR operations in software in some embodiments.

In various embodiments of the invention, the operations discussed herein, e.g., with reference to FIGS. 1-5, may be implemented as hardware (e.g., logic circuitry), software (including, for example, micro-code that controls the operations of a processor such as the processors discussed with reference to FIGS. 4-5), firmware, or combinations thereof, which may be provided as a computer program product, e.g., including a tangible machine-readable or computer-readable medium having stored thereon instructions (or software procedures) used to program a computer (e.g., a processor or other logic of a computing device) to perform an operation discussed herein. The machine-readable medium may include a storage device such as those discussed with respect to FIGS. 4-5.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection). Accordingly, herein, a carrier wave may be regarded as comprising an intangible machine-readable medium.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A method comprising:
   multiplying, at a processor, a most significant portion of a product of a carry-less multiplication with a first value to generate a second value;
   multiplying, at the processor, a most significant portion of the second value with a least significant portion of an irreducible polynomial of a final field used in a block cipher to generate a third value; and
   determining, at the processor, whether a remainder exists based on the third value, wherein non-existence of the remainder is to indicate that an encrypted message is authentic in accordance with Galois Counter Mode (GCM).

2. The method of claim 1, wherein the first value comprises a quotient from a division of $2^{256}$ with the irreducible polynomial of the final field used in the block cipher in accordance with Galois Counter Mode (GCM).

3. The method of claim 2, wherein the block cipher comprise an Advanced Encryption Standard (AES) cipher.

4. The method of claim 1, wherein determining the remainder comprises exclusive OR-ing a least significant portion of the third value with a least significant portion of the product.

5. The method of claim 1, further comprising performing a carry-less multiplication operation of a ciphertext with a hash value to generate the product.

6. The method of claim 5, wherein the ciphertext and the hash value each comprise 128 bits of data.

7. The method of claim 1, wherein the product comprises 256 bits of data and the most significant portion of the product comprises 128 bits of data.

8. The method of claim 1, wherein the multiplying operations are performed by 64-bit carry-less multiplication operations.

9. The method of claim 1, wherein multiplying the most significant portion of a product comprises:
   shifting 64 most significant bits of a 128-bit input by 63, 62 and 57 bit positions to right; and
   exclusive OR-ing the shifted bits with a 64 least significant bits of the input.

10. The method of claim 1, wherein multiplying the most significant portion of the second value comprises:
    shifting a 128-bit input by 1, 2 and 7 positions to left; and
    exclusive OR-ing the shifted bits.

11. A non-transitory computer-readable medium comprising one or more instructions that when executed on a processor configure the processor to:
    multiply a most significant portion of a product of a carry-less multiplication with a first value to generate a second value; and
    multiply a most significant portion of the second value with a least significant portion of an irreducible polynomial of a final field used in a block cipher to generate a third value;
    determine whether a remainder exists based on the third value, wherein non-existence of the remainder is to indicate that an encrypted message is authentic in accordance with Galois Counter Mode (GCM).

12. The computer-readable medium of claim 11, further comprising one or more instructions that configure the processor to perform a carry-less multiplication operation of a ciphertext with a hash value to generate the product.

13. The computer-readable medium of claim 11, further comprising one or more instructions that configure the processor to:
    shift 64 most significant bits of a 128-bit input by 63, 62 and 57 bit positions to right; and
    exclusive OR the shifted bits with a 64 least significant bits of the input.

14. The computer-readable medium of claim 11, further comprising one or more instructions that configure the processor to:
    shift a 128-bit input by 1, 2 and 7 positions to left; and
    exclusive OR the shifted bits.

15. A system comprising:
    memory to store a carry-less multiplication instruction; and
    a processor to execute the carry-less multiplication instruction to determine whether an encrypted message is authentic, wherein existence of a remainder is to be determined based on multiplying a most significant portion of a product of a carry-less multiplication with a first value to generate a second value and multiplying a most significant portion of the second value with a least significant portion of an irreducible polynomial of a final field used in a block cipher, wherein non-existence of the remainder is to indicate that the encrypted message is authentic in accordance with Galois Counter Mode (GCM).

16. The system of claim 15, wherein the processor is to perform a plurality of computations in accordance with Galois Counter Mode to determine authenticity of the encrypted message.

17. The system of claim 15, wherein the processor comprises the memory.

18. The system of claim 15, wherein the processor comprises one or more processor cores.

19. The system of claim 15, further comprising a network interface device to receive the message over a computer network.

20. The system of claim 15, wherein the processor is to perform a carry-less multiplication operation of a ciphertext with a hash value to generate the product.

* * * * *

UNITED STATES PATENT AND TRADEMARK OFFICE
CERTIFICATE OF CORRECTION

| | | |
|---|---|---|
| PATENT NO. | : 8,804,951 B2 | |
| APPLICATION NO. | : 13/196718 | |
| DATED | : August 12, 2014 | |
| INVENTOR(S) | : Shay Gueron et al. | |

It is certified that error appears in the above-identified patent and that said Letters Patent is hereby corrected as shown below:

On the title page, (56), under "OTHER PUBLICATIONS", in column 2, line 5, Delete "2008102147594," and insert -- 200810214759.4, --, therefor.

Signed and Sealed this
Fourteenth Day of April, 2015

Michelle K. Lee
*Director of the United States Patent and Trademark Office*